United States Patent [19]

Burk et al.

[11] Patent Number: 5,725,048
[45] Date of Patent: Mar. 10, 1998

[54] PROCESS FOR COOLING DRIVE COMPONENTS AND HEATING THE PASSENGER COMPARTMENT OF A MOTOR VEHICLE, ESPECIALLY AN ELECTRICALLY DRIVEN VEHICLE, AND ARRANGEMENT FOR IMPLEMENTING THE PROCESS

[75] Inventors: Roland Burk, Kornwestheim; Thomas Heckenberger, Leinfelden-Echterdingen; Hans-Joachim Krauss, Stuttgart; Michael Loehle, Esslingen, all of Germany

[73] Assignee: Behr GmbH & Co., Stuttgart, Germany

[21] Appl. No.: 98,352

[22] PCT Filed: Oct. 1, 1992

[86] PCT No.: PCT/EP92/00466

§ 371 Date: Aug. 11, 1993

§ 102(e) Date: Aug. 11, 1993

[87] PCT Pub. No.: WO92/16389

PCT Pub. Date: Oct. 1, 1992

[30] Foreign Application Priority Data

Mar. 19, 1991 [DE] Germany .................. 41 08 958.8

[51] Int. Cl.$^6$ ................................................ F25B 29/00
[52] U.S. Cl. ............................. 165/42; 165/43; 165/248; 165/236; 165/54; 62/244; 62/95; 62/325; 237/12.3 R; 237/12.3 A; 237/12.3 B
[58] Field of Search .................. 165/42, 43, 248, 165/16, 236, 54; 62/244, 95, 325; 237/12.3 R, 12.3 A, 12.3 B

[56] References Cited

U.S. PATENT DOCUMENTS

| | | | |
|---|---|---|---|
| 1,880,493 | 10/1932 | Rundlett . | |
| 1,980,109 | 11/1934 | Stockly | 165/16 |
| 2,318,893 | 5/1943 | Smith | 165/16 |
| 2,686,661 | 8/1954 | Gillick et al. | 165/16 |
| 2,703,680 | 3/1955 | Nallinger | 237/12.3 B |
| 2,780,077 | 2/1957 | Jacobs | 62/117.1 |
| 2,851,254 | 9/1958 | Messinger et al. | 165/16 |
| 2,876,998 | 3/1959 | Csabi | 165/43 |
| 3,451,469 | 6/1969 | Hall et al. | 237/12.3 R |
| 3,496,855 | 2/1970 | De Boer | 165/42 |
| 4,072,186 | 2/1978 | Barton | 237/12.3 R |
| 4,118,209 | 10/1978 | Exler et al. | 165/16 |
| 4,220,197 | 9/1980 | Schaefer et al. | 165/35 |
| 4,566,531 | 1/1986 | Stolz | 165/42 |
| 5,190,096 | 3/1993 | Taniguchi et al. | 237/12.3 R |

FOREIGN PATENT DOCUMENTS

| | | |
|---|---|---|
| 0 008 384 | 3/1980 | European Pat. Off. . |
| 2 006 802 | 9/1971 | Germany . |
| 24 51 221 | 5/1976 | Germany . |
| 90 01 590 | 4/1990 | Germany . |
| 0097940 | 8/1979 | Japan .............. 237/12.3 A |
| 0138413 | 8/1982 | Japan .............. 165/16 |
| WO8907738 | 8/1989 | WIPO .............. 165/16 |

*Primary Examiner*—John K. Ford
*Attorney, Agent, or Firm*—Foley & Lardner

[57] ABSTRACT

In vehicles having drive systems with a highly variable degree of heat generation but in which the total quantity of heat generated is small, the heat given off is inadequate to warm the vehicle properly. The cooling system must nevertheless be designed for the worst-possible operating point, i.e. the greatest amount of heat generated, even if it is generated only briefly. It is the purpose of the present development to make the best possibly exergetic use of the available energy sources while ensuring that the drive components are cooled. The air extracted from the passenger compartment (1) comprises a proportion of exhaust air and one of recirculated air, where the recirculated air is heated in the heat exchanger (9) for the cooling circuit (16) of the drive system and taken to the passenger compartment. The system is particularly suitable for electric vehicles, vehicles with hydrogen and hybrid drives and vehicles developing little heat.

10 Claims, 5 Drawing Sheets

PROCESS FOR COOLING DRIVE COMPONENTS AND HEATING THE PASSENGER COMPARTMENT OF A MOTOR VEHICLE, ESPECIALLY AN ELECTRICALLY DRIVEN VEHICLE, AND ARRANGEMENT FOR IMPLEMENTING THE PROCESS

The invention relates to a process for cooling drive components and for heating a passenger compartment of a motor vehicle, especially of an electrically driven vehicle, and a device for implementing the process.

Hitherto conventional motor vehicles possess a combustion engine in which a large quantity of the supplied energy is converted into heat, which is discharged as dissipated heat in a radiator to the ambient air. The quantity of heat which is available after a warm-up phase of the internal combustion engine is greater than the energy requirement which is required even on cold winter days for the vehicle heating.

Alternative drive concepts have however already been proposed using an electric motor, for example, the energy for which is supplied from a battery unit. In drive systems of this kind also, a certain dissipated heat is generated in the drive motor, in the transmission, in the power control, in the battery unit and, where appropriate, in further components. This dissipated heat is by no means sufficient, in terms of heat quantity, for a heating operation of the passenger compartment, especially under low external temperatures.

For the cooling of the drive components, it has already been proposed to provide corresponding cooling ducts for a liquid coolant, so that the coolant is able to flow through all heat-generating components and draws off the heat energy from the said components. In the arrangement known from DE-GM 90 01 590, the heat is discharged from a cooler or from a heat exchanger disposed in the inlet duct to an air current. The cabin air is circulated, a part-current being discharged to the ambient air and fresh air being supplied.

The object of the present invention is to provide a process for cooling drive components and for heating a passenger compartment of a motor vehicle, in which the best possible exergetic use is made of the available energy sources and the cooling of the drive components is herewith assured in combination with improved heat recovery, all possible climatic conditions being taken into account. The object of the invention is additionally to provide a device for the implementation of this process.

Based upon a process of the generic type defined in the preamble of Claim 1, the said object is achieved according to the invention by the characterizing features of Claim 1.

The essential advantage consists here in the fact that the heat of the air located in the passenger compartment is sensibly recovered, so that only an unavoidable heat loss has to be re-compensated by the heat sources present in the vehicle.

The above-stated object in relation to the creation of a device for cooling a drive motor and for heating a passenger compartment of a vehicle, of the generic type defined in the preamble of Claim 5, is achieved according to the invention by the characterizing features of Claim 5.

The essential advantage of this device consists in the fact that, by virtue of the control elements and the blower, an adequate cool-air current is constantly provided by the heat exchanger, whereas the heat energy drawn off from the heat exchanger and also the heat energy contained in the recirculated-air current of the air-guide duct is purposefully supplied, only where necessary and according to the required heat quantity, to the passenger compartment.

A more simply designed device in terms of the necessary system parts consists in a further heat exchanger being provided, which can be flowed through by the coolant and is disposed in an exhaust-air duct, commencing at a second waste-air opening, of the passenger compartment and in there being provided between the second waste-air opening and the heat exchanger an inflow control element into which a cool-air duct emerges.

To the cooling circuit there can be connected further heat-generating auxiliary units and, for the circulation of the coolant, a coolant pump is provided which is driven by an electric motor. In order to achieve an optimal design of the heat exchanger, it is expedient for the cooling liquid to be conducted to the said heat exchanger at a relatively constant temperature level. For this purpose, a heat store is provided before the inlet of the coolant into the heat exchanger, which heat store compensates for the extreme fluctuations in heat generation in the individual components. Particularly suitable at this location is a latent heat store, which makes it possible, even after a journey break of several hours, to have heat energy immediately available again for heating the passenger compartment.

A further advantage is derived from the fact that heat and moisture are extracted from that proportion of the exhaust air which is to be drawn off from the passenger compartment and is available again for the intake air. For this reason, an exhaust air/fresh air heat exchanger is provided, in which the fresh air is pre-heated by the heat extracted from the exhaust air. The recovery of heat from the exhaust air allows a sufficient proportion of fresh air to ensure that an interior humidity which is acceptable from the safety aspects and on comfort grounds is not exceeded.

For further increased comfort, a refrigerant circuit comprising an evaporator and a condenser is provided, thereby enabling cooled air to be supplied, under high external temperatures, to the passenger compartment. The temperature of the passenger compartment can thereby be controlled so as to cater for all climatic conditions. In "winter operation", the refrigerant circuit operates as a heat pump and thus delivers an additional proportion to the heating energy. The arrangement of further heat sources can be provided, electric booster heaters, in particular, entering here into consideration. During the charging phase of the vehicle battery, the air in the passenger compartment can be heated by waste heat generated at the battery. By suitable controlling of the electric booster heater, the interior can be additionally heated during the charging, so that, at the outset of a journey, a warm passenger compartment is already available. The device for heating or air-conditioning the passenger compartment and for cooling the drive device can be controlled on the air side or also on the liquid side. For a liquid-sided control, a widened cooling circuit is provided comprising two separate flow branches, to each of which flow branches there is assigned a coolant/air heat exchanger. Valve means are herewith provided, by which the flow branches can be switched over to the optional through-flow of the heat exchangers.

Illustrative embodiments of the subject of the invention are explained in greater detail below with reference to the drawing, in which:

FIG. 2a and

FIG. 3a and

FIG. 4a and

FIG. 5a and

Figure 1:
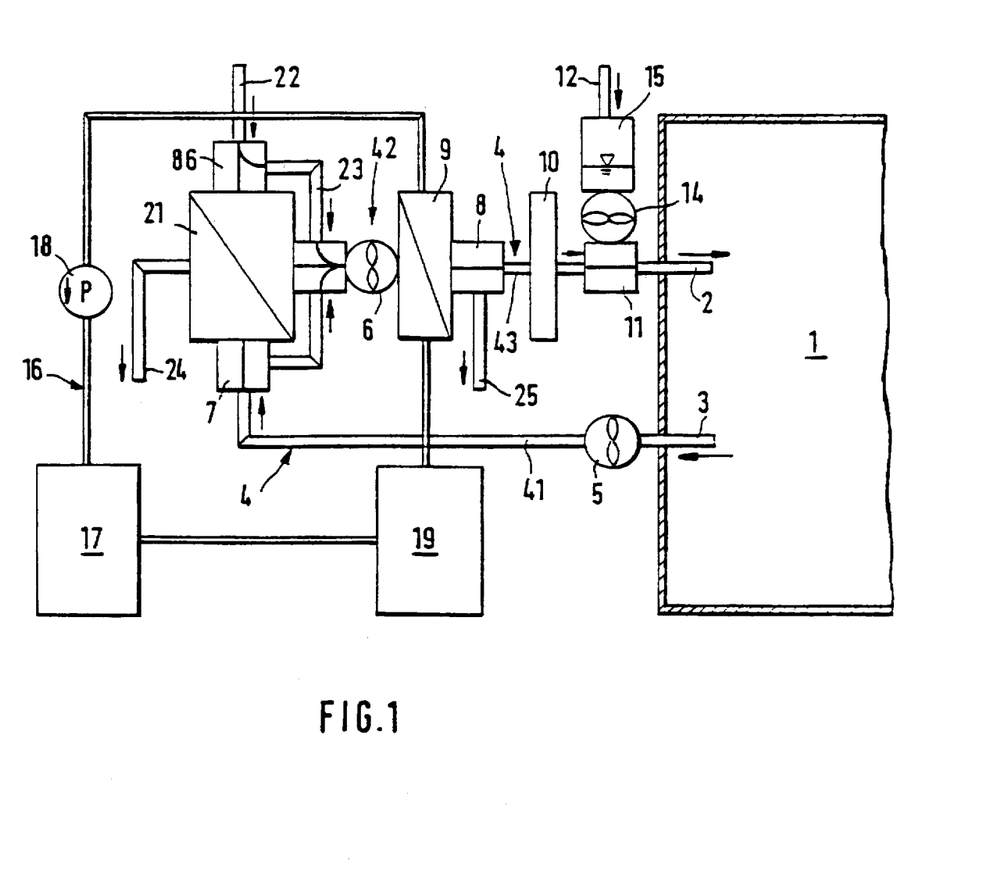
FIG. 1 shows the diagrammatic representation of a combined motor-cooling and passenger compartment-heating system for an electric vehicle.

In FIG. 1, the reference symbol 1 denotes a passenger compartment of an electric vehicle, in which an intake-air opening 2 and an outflow opening 3 are provided. The outflow opening 3 forms the start of an air-guide duct 4, which emerges at the intake-air opening 2 and essentially comprises 3 sections 41, 42 and 43. The first section 41 of the air-guide duct 4 extends up to a first air-current control element 7 and in this section 41 there is located a blower 5. The second section 42 of the air-guide duct 4 commences at the first air-current control element 7 and extends up to a second air-current control element 8, a blower 6 and a heat exchanger 9 for cooling the drive unit 17 being disposed in this second section 42.

From the second air-current control element 8, the third section 43 of the air-guide duct 4 extends up to the intake-air opening 2 on the passenger compartment 1. This third section 43 leads through a heat source 10 to an air-mixing chamber 11, which is disposed directly or closely before the intake-air opening 2. Emerging into the air-mixing chamber 11 is a cold-air conduit 12, through which a proportion of cold or fresh air is mixed together with the air current which is conducted in the section 43. For the provision of the necessary quantity of fresh or cold air, a blower 14 is provided in the cold-air conduit 12. For the cooling of the air in the cold-air conduit 12, there is provided, according to FIG. 1, an evaporation cooler 15.

The heat exchanger 9 which is flowed through by the air current in the second section 42 of the air-guide duct 4 is acted upon, on the other side of the heat-exchange walls, by the coolant of a cooling circuit 16 for the drive unit 17 of the electric vehicle. The coolant of the cooling circuit 16 herewith serves not only to cool the drive motor itself, but 'drive' should here be taken to mean the entire arrangement comprising motor, transmission, power control and battery unit. In the cooling circuit 16 there is located a coolant pump 18 for transporting the coolant. Due to the enormous fluctuations in heat generation in the components of the drive 17, a heat store 19 is provided, which acts as a buffer and is preferably configured as a latent heat store, by virtue of which the temperature fluctuations are dampened and the heat supplied to the heat exchanger 9 thus remains at a level which is kept relatively constant within certain limits.

From the first air-current control element 7, a flow path leads through an air/air heat exchanger 21, through which, on the other side, a fresh-air duct 22 leads into the second section 42 of the air-guide duct 4. Whilst the air conducted through the flow path constantly acts upon the heat exchanger 21, a by-pass conduit 23 is provided for the other side of the heat exchanger 21, which by-pass conduit can be controlled in terms of its air throughput by means of an air flap 86. The heat exchanger can be thereby prevented from icing up under low external temperatures. The air conducted through the flow path is discharged into the environment through a corresponding blow-out opening 24. The second air-current control element 8 possesses, in addition to the output opening for the third section 43 of the air-guide duct 4, a second output for an exhaust-air duct 25, through which that air which is not recycled to the passenger compartment 1 is discharged into the ambient air.

The heating operation for the passenger compartment is dependent upon a plurality of influences, primarily however upon the ambient temperatures, upon the solar irradiation and upon the interior temperature in the passenger compartment. The "heating" function and the required heat quantity should therefore be adjusted in dependence upon the requirement, whereas the cooling of the drive is always required whilst the electric vehicle is running, when the cooling performance requirement is also subject to certain fluctuations which are determined, for example, climatically or by the performance profile.

The cooling of the drive is effected by the fact that the coolant flows through corresponding cooling ducts of the engine, the transmission, the battery (where appropriate, with an intermediate heat carrier circuit) and the power control, the coolant being transported in the cooling circuit 16 by means of the coolant pump 18. The generation of heat and the quantity of heat which thus has to be drawn off are subject to extreme fluctuations, especially where load changes occur such as acceleration, braking etc. In order to avoid the need for the heat exchanger 9 to be made unnecessarily large in terms of its dimensions, the heat store 19 has the function of a thermal buffer which is capable of taking up heat quantities which frequently occur only briefly and of feeding the coolant at a relatively constant temperature level to the heat exchanger 9. The heat contained in the coolant is discharged in the heat exchanger 9 to the air flowing through the second section 42 of the air-guide duct 4.

If the vehicle is operated under external temperatures which do not necessitate a heating of the passenger compartment 1, then the air current which is necessary for the take-up of heat in the heat exchanger 9 and which is generated by the blower 6 is sucked at least approximately in full through the fresh-air duct 22 and blown by the cooler to the second air-current control element 8. Since no heating requirement exists for the passenger compartment 1, the second air-current control element 8 is found in a setting which guides the entire volume of air which is blown through the heat exchanger 9 through the exhaust-air duct 25 and into the open.

Due to the oxygen required by the vehicle passengers, a certain volume of air has to be constantly replaced in the passenger compartment. For this purpose, the blower 14 generates an air current in the cold-air conduit 12, the temperature of the fresh air in the evaporation cooler 15 being able to be lowered according to requirement. This cold air is then led through the air-mixing chamber 11 and the intake-air opening 2 into the passenger compartment 1. The same volume of air is extracted from the passenger compartment at another location, namely at the outflow opening 3, and transported by means of the blower 5 through the first section 41 of the air-guide duct 4 and through the heat exchanger 21 and then discharged through the blow-out opening 24 to the ambient air.

If a heating requirement for the passenger compartment 1 exists, then influence is firstly exerted upon the second air-current control element 8, which conducts the air heated in the heat exchanger 9 in part or in full through the third section 43 of the air-guide duct 4 to the intake-air opening 2 of the passenger compartment 1.

Where the quantity of heat transferred in the heat exchanger 9 is not sufficient to heat the passenger compartment 1, the air flowing in through the fresh-air duct 22 is pre-heated in the heat exchanger 21 by heat energy being extracted from the exhaust air in the heat exchanger 21. The by-pass conduit 23 is in this case closed. Since the heat transfer in the heat exchanger 21 cannot be effected without dissipation, it is also possible to conduct a part of that air which is sucked out of the passenger compartment 1 through the outflow opening 3 directly from the first section 41 to the second section 42, by-passing the heat exchanger 21, this being effected by means of the first air-current control element 7.

This proportion of the air current which has been extracted from the passenger compartment 1 has a substantially higher temperature level than, for example, the ambient air on cold winter days, so that the heating-up of the air current in the heat exchanger 9 is effected from a significantly higher temperature level, thereby enabling a corresponding difference between the temperatures of the air sucked out at the outflow opening 3 and the air blown in at the intake-air opening 2. In such cases exhibiting an extreme heating requirement, the cold-air duct 12 is of course closed off.

Figure 2A:
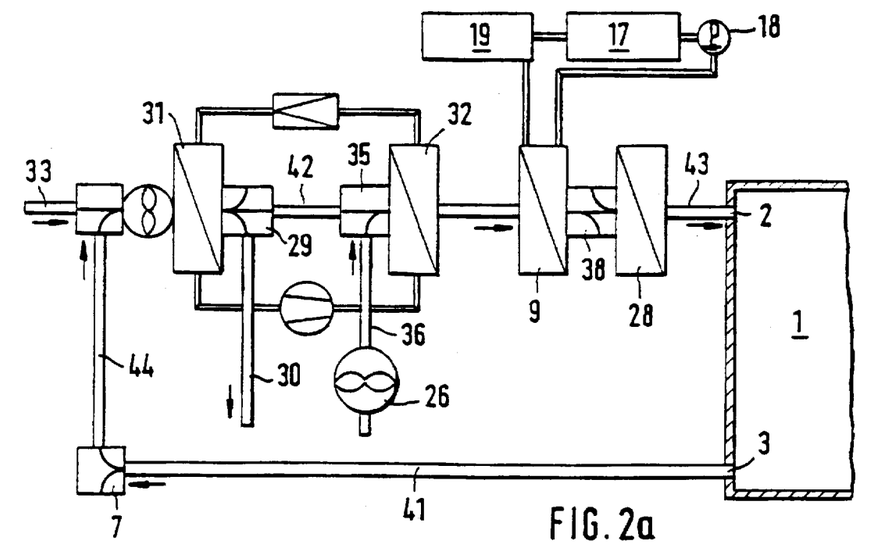
Figure 2B:
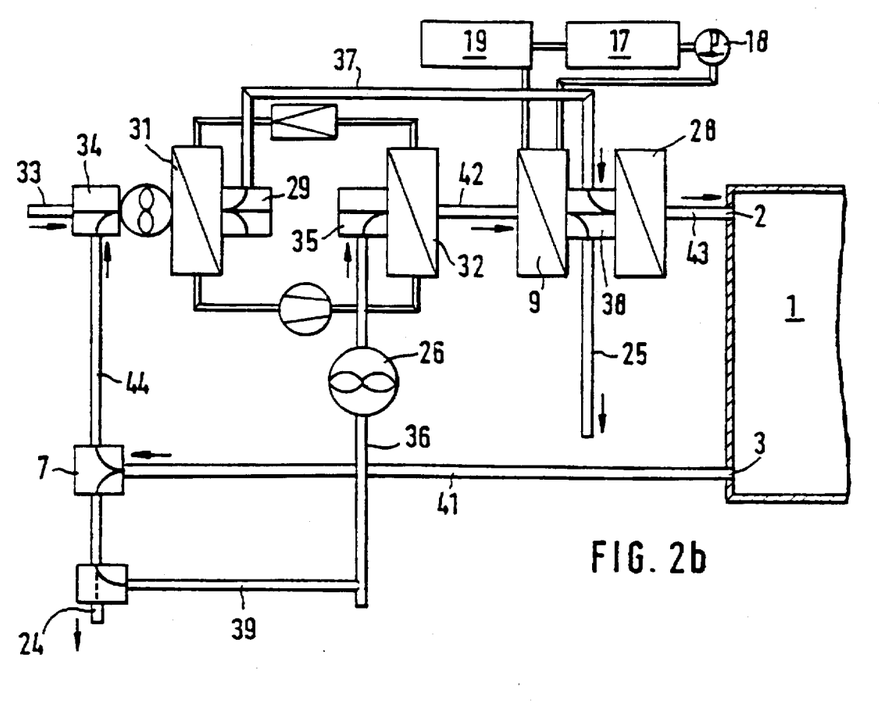
FIG. 2b show a combined motor-cooling and passenger compartment air-conditioning system, firstly in the "heating" function and secondly in the "cooling" function of the passenger compartment.

In FIGS. 2a and 2b, a combined motor-cooling and passenger compartment air-conditioning system is shown, to be precise in FIG. 2a the "passenger compartment heating" function—the so-called "winter operation" and in FIG. 2b the "passenger compartment cooling" function—the so-called "summer operation". On the passenger compartment 1 an outflow opening 3 is present from which the first section 41 of the air-guide duct extends, at the end of which there is disposed the first air-current control element 7. The first air-current control element 7 is able to control the air current to the blow-out opening 24 and to a fourth section 44 of the air-guide duct in chosen proportions, the control range lying between 0% and 100% in one of the two possible directions and the respectively complementary proportion flowing in the other direction.

The fourth section 44 extends from the first air-current control element 7 to a flow-quantity divider 29, which leads the air current optionally either to the heat exchanger 9 or directly to the intake-air opening 2 or to a waste-air duct 30. The system additionally comprises a refrigerant circuit, the evaporator 31 of which is disposed in the fourth section 44 and the condenser 32 of which in the second section 42, to be precise directly before the cooler 9. In order to supplement the air volume which, depending upon the setting of the first air-current control element 7, is discharged through the blow-out opening 24, a fresh-air duct 33 is provided, which can be shut off by means of an inflow control element 34.

Starting from the flow-quantity divider 29, there is disposed in the second section 42 of the air-guide duct firstly an inflow control element 35 which controls the inflow of fresh air through a fresh-air duct 36, there being disposed in this fresh-air duct a blower 26. Downstream from the heat exchanger 9 there is disposed an air-current control element 38, at which the second section 42 of the air-guide duct ends and which is adjoined by the third section 43 and the exhaust-air duct 25. Emerging into the air-current control element 38 is a by-pass 37, which—starting from the flow-quantity divider 29—bridges the condenser 32 and the heat exchanger 9. In the third section 43 there is disposed the electric booster heater 28 and the end of the air-guide duct forms the intake-air opening 2 in the passenger compartment 1.

In the "winter operation" represented in FIG. 2a, the air is sucked out of the passenger compartment 1 through the outflow opening 3 and conducted through the first section 41 to the first air-current control element 7. According to the setting of the air-current control element 7, the entire air current is conducted to the fourth section 44 and flows through the evaporator 31. The flow-quantity divider 29 branches off a part of the total current, which is then led through the exhaust-air duct 30 and into the open. The other part of the total air current is supplied, by virtue of the setting of the flow-quantity divider 29, to the condenser 32, the air volume being supplemented, before entering into the condenser 32, by the fresh-air duct 36, which air volume has been supplied from the flow-quantity divider 29 to the exhaust-air duct 30.

In the evaporator 31 the air is cooled and hence also dehumidified, heat energy being extracted from the air current and discharged to the coolant. This heat energy is transferred in the condenser 32 back to the air current in the second section 42, so that the air current is already warmed there. The heat recovery in the condenser 32 is enhanced by the fact that a drier is disposed ahead of the condenser 32 in the air-flow path, thereby enabling the air current to be cooled below 0° C. In the heat exchanger 9 connected downstream, the temperature of the air current is raised further, which air current is then conducted through the air-current control element 38 to the passenger compartment 1, the temperature level being able to be raised still further, where appropriate, by an electric booster heater 28.

In the "summer operation" of the arrangement, cooled air has to be supplied to the passenger compartment 1, though the cooling of the drive must also be assured simultaneously. This working method is represented in FIG. 2b. The air current sucked out of the passenger compartment 1 through the first section 41 is divided in the first air-current control element 7, one part being supplied to the fourth section 44 and the other part being conducted via a connecting conduit 39 to the fresh-air duct 36 and mixed together in this with the inflowing fresh air. This air current then acts upon the condenser 32, in which the refrigerant is liquefied and thereby cooled. This air current issuing from the condenser then acts upon the heat exchanger 9, so as to be finally discharged, by virtue of the setting of the air-current control element 38, through the exhaust-air conduit 25 into the ambient air.

Due to the division of the air current, the air current has in the fourth section 44, directly after the air-current control element 7, a reduced volume, which is re-supplemented by the supply of fresh air in the fresh-air duct 33. This air current then acts upon the evaporator 31, in which heat energy is extracted from the air current, thereby giving rise to a drop in temperature and a dehumidification of the air associated therewith. By virtue of the setting of the flow-quantity divider 29, the air current issuing from the evaporator 31 is supplied in full to the by-pass 37, thereby by-passing the condenser 32 and the heat exchanger 9, and then makes its way through the intake-air opening 2 into the passenger compartment 1. The booster heater 28 is not, of course, switched on in this case.

Figure 3A:
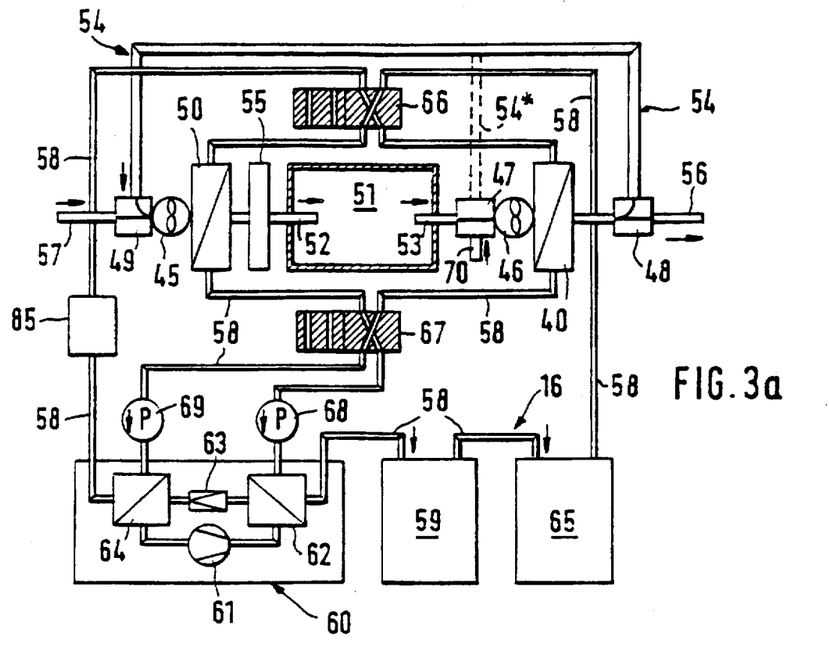
Figure 3B:
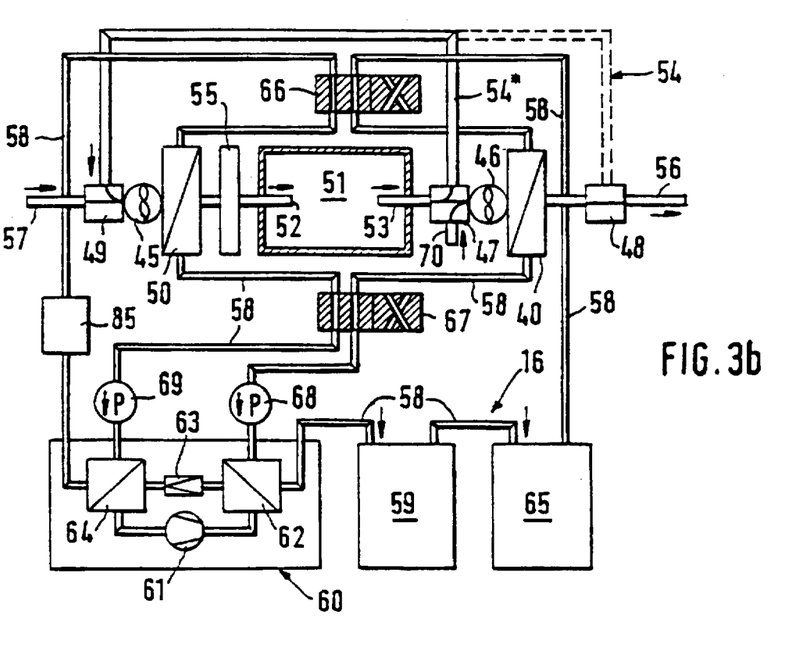
FIG. 3b show a constructional variant to FIG. 2, having a widened coolant circuit and liquid-sided regulation of the heating or air-conditioning operation.

The cooling device, shown in FIG. 3a and FIG. 3b, for a drive and air-conditioning system for the passenger compartment comprises a coolant circuit by means of which a liquid-sided regulation of the total system is possible. FIG. 3a here again shows the "winter operation", i.e. in which the passenger compartment has a heating requirement, and FIG. 3b shows the "summer operation", i.e. in which cooled air is supplied to the passenger compartment.

In FIGS. 3a and 3b, 51 denotes a passenger compartment which is provided with an intake-air opening 52 and an outflow opening 53. An air-guide duct denoted in its entirety by 54 commences at the outflow opening 53 and ends at the intake-air opening 52. In the air-guide duct 54, there are disposed, in the named order, a first air-current control element 47, a blower 46, a first heat exchanger 40, a second air-current control element 48, an inflow control element 49, a further blower 45, a second heat exchanger 50 and finally a booster heater 55. 56 denotes an exhaust-air duct through which the exhaust air or the exhaust-air proportion can be led, by means of the second air-current control element 48, into the ambient air. A fresh-air duct 57 emerges into the inflow control valve 49 or, at this location, into the air-guide duct 54. Where the first air-current control element 47 is set correspondingly, a by-pass 54* bridges the downstream-disposed blower 46, the first heat exchanger 40 and the second air-current control element 48.

The heat exchangers 40 and 50 are acted upon by a liquid coolant, which flows in a cooling circuit for the drive components of the vehicle, the connecting conduits of the cooling circuit being denoted in their entirety by the reference symbol 58 and the drive components by 59. Interpolated into the cooling circuit is a refrigerating module 60, which contains a refrigeration plant comprising a compressor 61, a condenser 62, an expansion device 63 and an evaporator 64. The refrigerating module 60 is hermetically sealed on the refrigerant side, but possesses sockets for connecting conduits 58 to enable the condenser 62 and evaporator 64 to be acted upon by the coolant of the coolant circuit.

The drive components 59 to be cooled are connected in series, via corresponding connecting conduits 58, to the condenser 62 and a heat store 65. The heat store 65 here has the same function as the heat store 19 in FIG. 1. From the heat store 65, a connecting conduit 58 leads to a first directional control valve 66, which is configured as a 4/2-way valve. From the evaporator 64, a connecting conduit 58 leads to a cold store 85 and from there to an input of the first directional control valve 66. The output sockets of the first directional control valve 66 are respectively connected to one of the heat exchangers 40 and 50, the output sockets of the heat exchangers 40 and 50 being connected to the inputs of a second directional control valve 67, which is likewise configured as a 4/2-way valve. One of the output sockets of the second directional control valve 67 leads to the condenser 62, a first coolant pump 68 being interpolated therebetween, and the other output socket of the directional control valve 67 is connected to the evaporator 64, a second coolant pump 69 being interpolated therebetween.

The "winter operation" of the system described in FIG. 3 is represented in FIG. 3a. It is evident from this that, in order to cool the drive components 59, the coolant is pumped by means of the first coolant pump 68 through the connecting conduits 58 and hereupon takes up the dissipated heat generated in the drive components 59. In the heat store 65 connected downstream of the drive components 59, heat is taken up or discharged depending upon the store temperature and temperature of the supplied coolant. The coolant flows from the heat store 65 to the first directional control valve 66, which, in "winter operation", adopts a setting such that the heat store 65 is connected to the second heat exchanger 50. In the second heat exchanger 50, the heat energy of the coolant is discharged to the air flowing through the heat exchanger 50. By virtue of the setting of the second directional control valve 67, the second heat exchanger 50 is connected to the first coolant pump 68 or to the downstream condenser 62, in which the coolant takes up the generated condensation heat.

The other branch of the coolant circuit is switched in "winter operation" such that the evaporator 64 is connected, via the cold store 85 and the corresponding setting of the first directional control valve 66, to the first heat exchanger 40, i.e. coolant is supplied to the first heat exchanger 40 at a relatively low temperature. The coolant which warms up in the heat exchanger 40 is supplied, by virtue of the corresponding setting of the second directional control valve 67, to the second coolant pump 69, which pumps the coolant through the evaporator 64. In this operating mode, the cold store 85 serves merely to maintain a uniform temperature profile.

The heating of the passenger compartment 51 is effected by air being sucked out of the passenger compartment 51 through the outflow opening 53, to be precise by means of the blower 46. The air flows through the first heat exchanger 40 and is cooled in this, the air being simultaneously dehumidified. The second air-current control element 48 splits up the total air current, a proportion being conducted through the exhaust-air duct 56 into the open and another part being guided as so-called recirculated air through the air-guide duct 54 to an inflow control element 49. The air volume blown out through the exhaust-air duct 56 is supplemented by fresh air, which, when the inflow control element 49 is set correspondingly, is sucked in through the fresh-air duct 57 by means of the blower 45. The total air current formed from recirculated air and fresh air is then guided through the second heat exchanger 50 and the booster heater 55, which can be connected up as required, and is finally blown through the intake-air opening 52 into the passenger compartment 51.

Under higher external temperatures, the system described in FIG. 3 is operated in the manner represented in FIG. 3b; this is the so-called "summer operation". The cooling of the drive components 59 is once again effected by the fact that the coolant, which is pumped through the condenser 62 and the drive components 59 by means of the first coolant pump 68, takes up the heat which is generated there. The coolant then flows through the heat store 65 and leaves it at a relatively constant temperature level. The setting of the first directional control valve 66 leads this coolant current to the first heat exchanger 40, in which the heat is discharged to the air flowing through the said heat exchanger 40. The coolant leaving the first heat exchanger 40 is supplied in turn, by virtue of the setting of the second directional control valve 67, to the first coolant pump 68.

In the other coolant branch, the second coolant pump 69 pumps coolant through the evaporator 64, as a result of which the coolant is brought to a lower temperature level. The cold store 85 removes cold energy from the through-flowing coolant until its storage capacity is reached. By virtue of the setting of the first directional control valve 66, the coolant which has been heavily cooled in the evaporator 64 is supplied to the second heat exchanger 50, so that the air flowing through the said heat exchanger 50 is cooled. The coolant here-upon warms up in the second heat exchanger 50 and flows, by virtue of the setting of the second directional control valve 67, back to the second coolant pump 69. Since, in "summer operation", the aim is to lower the temperature in the passenger compartment 51 or keep it at a low temperature level, the air sucked out of the passenger compartment 51 through the outflow opening 53 is led, by means of the first air-current control element 47, almost in full through the air-guide duct 54* to the inflow control element 49.

Due to the necessary exchange of a part of the air volume located in the passenger compartment 51—as has already been stated in relation to the preceding figures—a proportion, which can amount for example to 20%, of the total air current sucked out of the passenger compartment 51 is supplied through the first air-current control element 47 to the blower 46. In order to maintain the cooling of the coolant flowing through the first heat exchanger 40, ambient air is sucked in by the blower 46 through a fresh-air duct 70, which ambient air, jointly with the exhaust-air proportion, flows through the first heat exchanger 40 and, by virtue of the setting of the second air-current control element 48, is blown out through the exhaust-air duct 56 into the ambient air. The recirculated-air current sucked in by the blower 45 through the air-guide duct 54* or 54 is supplemented by an air volume sucked in through the fresh-air duct 57, this total air current acting upon the second heat exchanger 50 and being cooled in the latter. This cold air is then guided through the intake-air opening 52 into the passenger compartment 51. Since a considerable proportion of the air current guided through the second heat exchanger 50 consists of already relatively cold recirculated air, there is essentially, in the heat exchanger 50, only a need for the cooling performance for cooling the fresh-air proportion to be produced. The cold store 85 has the essential advantage that, at the outset of a journey, the coolant flowing to the heat exchanger 50 is immediately cold and the air supplied to the passenger compartment 51 is thus able to be cooled. A rapid cooling of the passenger compartment air is thus achieved, even if the vehicle has been parked a while and has heated up as a result of solar irradiation.

The illustrative embodiment described in FIGS. 4a and 4b shows once again in FIG. 4a the "winter operation" and in FIG. 4b the "summer operation" of the air-conditioning and cooling device according to the invention. In this case, the assignment of the drive components 59, of the refrigerating module 60, of the heat store 65 and of the two coolant pumps 68 and 69 corresponds to that in FIG. 3. The refrigerant conduit 58 leaving the heat store 65 leads to a 3/2-way valve 71, from which connecting conduits 58 lead respectively to a heat exchanger 74 disposed on the intake-air side of the passenger compartment 51 and to a heat exchanger 75 disposed on the waste-air side of the passenger compartment 51. On the output side of the two heat exchangers 74 and 75, the connecting conduits 58 are brought back together and connected to the first coolant pump 68.

Figure 4A:
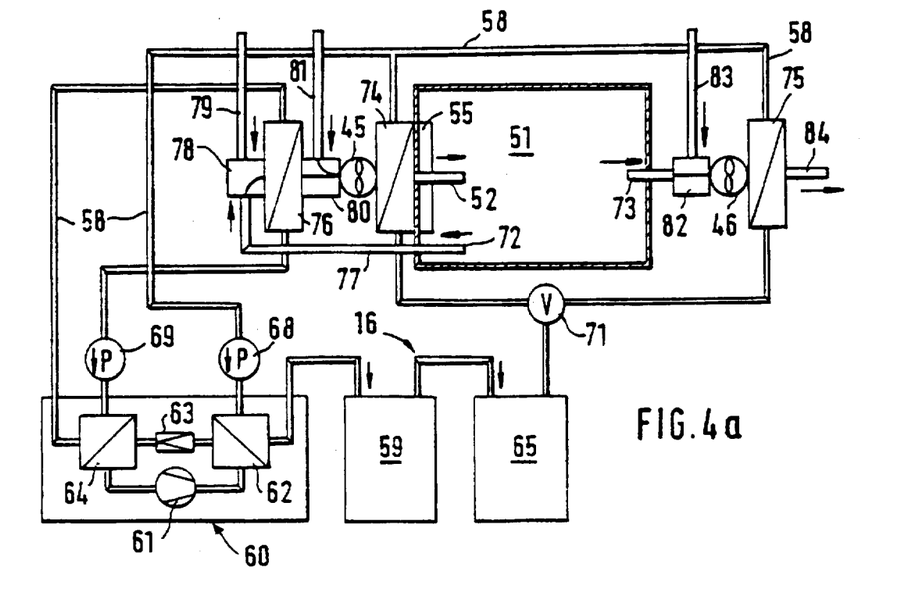
Figure 4B:
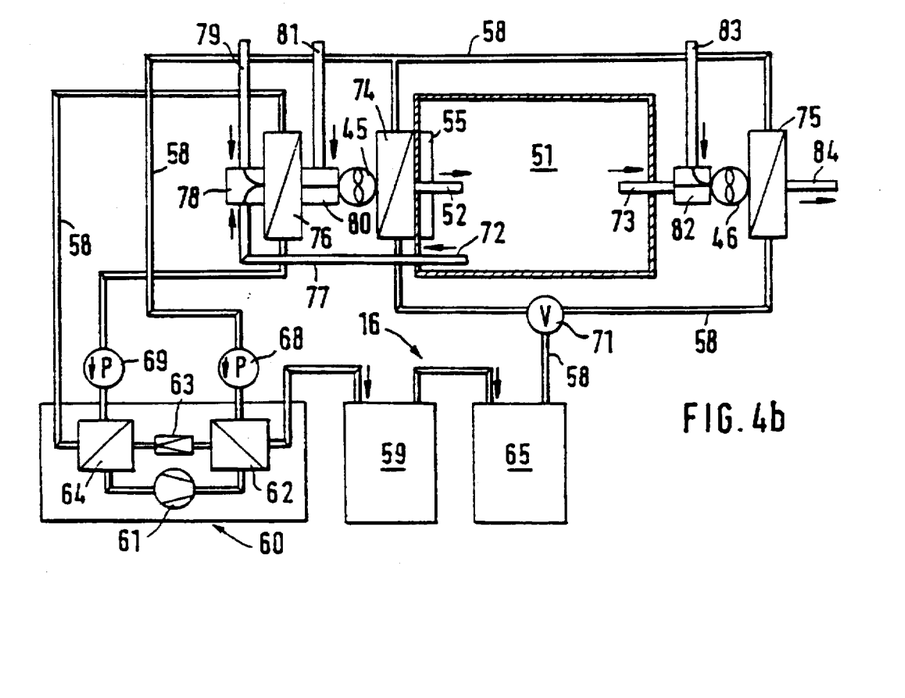
FIG. 4b show an alternative embodiment to FIG. 3.

The second coolant pump 69 and the evaporator 64 are now located in a separate coolant circuit which is always separate from the coolant circuit of the drive components. Starting from the evaporator 64, a connecting conduit 58 leads to a heat exchanger 76, which is connected in turn, on the output side, to the second coolant pump 69. The passenger compartment 51 possesses two completely separate outflow openings 72 and 73 disposed at different locations in the passenger compartment 51, the first outflow opening 72 being connected via an air-guide duct 77 to an intake-air control element 78. Emerging into the intake-air control element 78 is a fresh-air duct 79.

After-connected to the intake-air control element 78 is the heat exchanger 76, downstream of which there is disposed a second intake-air control element 80. By means of the second intake-air control element 80, fresh air can be sucked in through a further air duct 81, the air flow being generated by the blower 45, which guides the air current through the heat exchanger 74 and through a booster heater 55 and the intake-air opening 52 into the passenger compartment 51.

Downstream from the second outflow opening 73 there is disposed a third intake-air control element 82, into which a cool-air conduit 83 emerges. The blower 46 sucks air out of the passenger compartment 51 or through the cool-air duct 83 and blows this air through the heat exchanger 75 and finally through a waste-air duct 84 into the environment.

In the "winter operation" represented in FIG. 4a, the 3/2-way valve 71 is switched such that the connecting conduit 58 leaving the heat exchanger 65 is connected to the heat exchanger 74 disposed on the intake-air side on the passenger compartment 51. The coolant, which the first coolant pump 68 pumps through the condenser 62, the drive components 59 and the heat store 65, is guided through the heat exchanger 74 and there discharges the heat energy of the coolant to the air current, which is supplied to the passenger compartment 51. The coolant cooled in the heat exchanger 74 is sucked up, in turn, by the first coolant pump 68.

Since only a limited heating energy is available, passenger compartment air is sucked out through the first outflow opening 72, which air then makes its way through the air-guide duct 77 and the first intake-air control element 78 into the heat exchanger 76. In this heat exchanger the air is dehumidified and the temperature lowered somewhat. In the second intake-air control element, a fresh-air proportion is mixed together with the air issuing from the heat exchanger 76 and the entire air current blown by means of the blower 45 through the heat exchanger 74. The hot coolant flowing through the latter discharges its heat energy to the air current, so that warm air is supplied through the intake-air opening 52 to the passenger compartment 51. According to the fresh-air proportion mixed in through the air duct 81, a corresponding air volume is sucked out through the second outflow opening 73, this being effected by means of the blower 46, which transports the air through the waste-air duct 84 into the open.

In the "summer operation" represented in FIG. 4b, the 3/2-way valve 71 is switched such that the coolant leaving the heat store 65 is guided to the heat exchanger 75. There this coolant discharges its heat energy to the air current generated by the blower 46, which air current consists, for the one part, of passenger compartment air sucked out through the second outflow opening 73 and, for the other part, of fresh air sucked in through the cool-air duct 83. From the heat exchanger 75, the therein cooled coolant is guided back to the first coolant pump 68.

The recirculated air sucked out of the passenger compartment 51 through the first outflow opening 72 and the air-guide duct 77 is combined in the first intake-air control element 78 with a proportion of fresh air which flows in through the fresh-air duct 79. In the heat exchanger 76, this total air current is dehumidified and is then supplied by the second air-control element, which in this operating mode shuts off the air duct 81, to the blower 45, which conveys the air current without thermal treatment in the heat exchanger 74 through the intake-air opening into the passenger compartment 51.

Figure 5A:
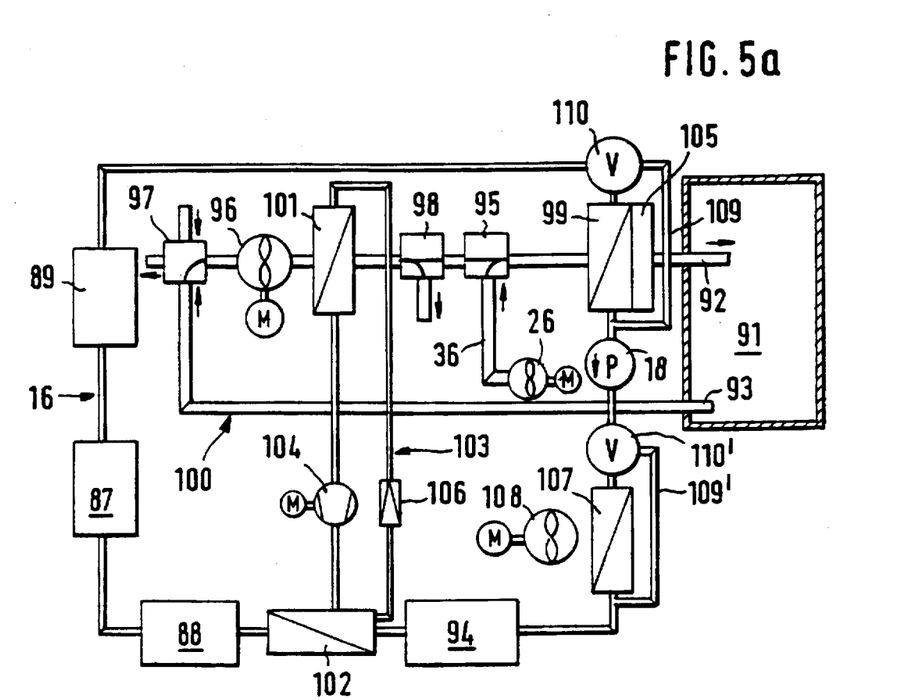
Figure 5B:
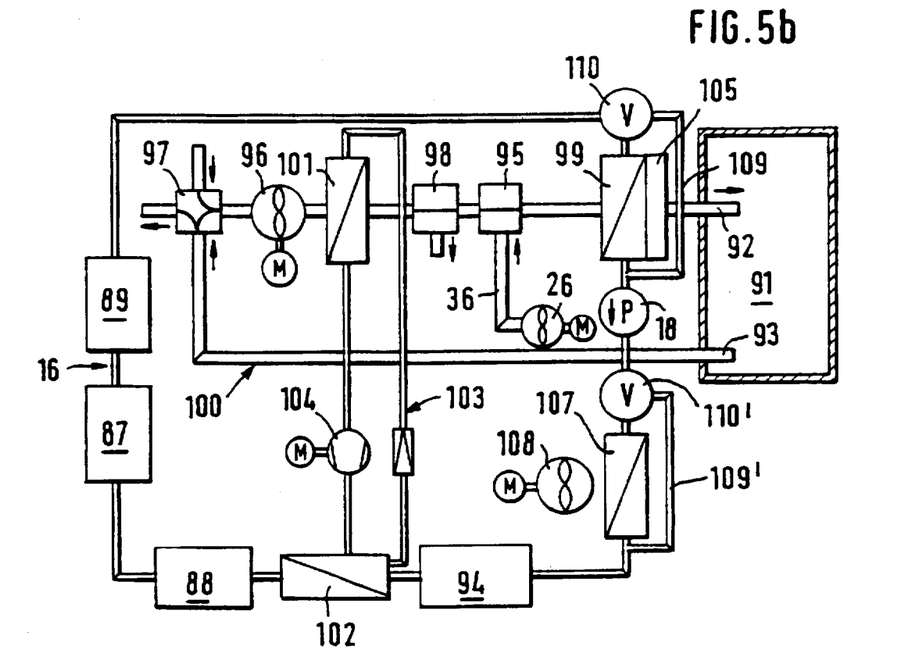
FIG. 5b show a constructional variant to FIG. 2, having an air-sided and liquid-sided regulation.

In FIGS. 5a and 5b, a combined motor cooling and passenger compartment air-conditioning system is shown, FIG. 5a showing the "heating" function, i.e. the "winter" operation, and FIG. 5b showing the "passenger compartment cooling" function, the so-called "summer operation". On a passenger compartment 91, an outflow opening 93 is present, from which an air-guide duct 100 extends to an intake-air opening 92. In this air-guide duct 100 there are disposed, in the order of listing, a first air-current control element 97, a blower 96, an evaporator 101, a second air-current control element 98, an inflow control element 95, a heat exchanger 99 and a booster heater 105. Connected to the inflow control element 95 is a fresh-air duct through which fresh air can be supplied, by means of a blower 26, to the heat exchanger 99. The heat exchanger 99 is connectable, on the other side, to a cooling circuit 16, which serves to cool a battery unit 87, a drive motor 88 and power electronics 94. A heat store 89 is additionally provided, which serves to dampen the enormous fluctuations in heat generation in the various units. Between the power electronics 94 and the drive motor 88 there is located in the coolant circuit 16 a condenser 102 of a refrigerant circuit 103, which comprises a compressor 104, an expansion valve 106 and the aforementioned evaporator 101. Finally, there is located in the coolant circuit 16 yet another heat exchanger 107, to which there is assigned a fan 108 for the adequate passage of cool air, and a coolant pump 18 for guaranteeing an adequate through-flow of coolant. Each of the heat exchangers 99 and 107 is provided with a by-pass conduit 109, 109', which can be controlled by means of valves 110 and 110'.

According to the representation in FIG. 5a, in order to heat the passenger compartment 91, that air volume in the first air-current control element 97 which has been extracted through the outflow opening 93 is supplied in full to the evaporator 101 and divided, on the outflow side of the evaporator 101, in the second-current control element 98, to be precise into a relatively small exhaust-air component and a larger recirculated-air component, this recirculated air being supplied to the heat exchanger 99. Before the heat exchanger 99, there is added to this recirculated-air current, by the inflow control element 95, a fresh-air component. The air which has been heated up in the heat exchanger 99 and which, where appropriate, can be brought by means of the booster heater 105 to a yet higher temperature level, is blown through the intake-air opening 92 into the passenger compartment 91. The heat generated in the drive components 87, 88 and 94 and subject, in dependence upon the vehicle running, to very large fluctuations, is taken in the heat store 89 and lea from there at a relatively constant temperature level, by virtue of the setting of the valve 110, through the heat exchanger 99 and, by virtue of the setting of the valve 110', through the by-pass conduit 109'. When the refrigerant circuit 103 is in operation, the air current led through the evaporator 101 is cooled and thereby dehumidified. The refrigerant in the evaporator 101 herewith takes up heat which is discharged in the condenser 102 to the coolant of the cooling circuit 16.

In the summer operation represented in FIG. 5b, cool air has to be supplied to the passenger compartment 91 and the heat energy nevertheless drawn off from the drive components 87, 88 and 94. By virtue of the setting of the first air-current control element 97, a large part of the air quantity drawn off from the passenger compartment 91 is discharged as exhaust air into the environment. A corresponding air volume is supplied as fresh air to the air-guide duct 100 and guided by the blower 96 through the evaporator 101. In the evaporator 101, the air current is heavily cooled and then supplied to the passenger compartment 91 through the heat exchanger 99, which is however inoperative in this operating mode. By virtue of the settings of the second air-current control element 98 and the inflow control element 95, the air current on the stretch between the evaporator 101 and the heat exchanger 99 remains unaffected. To ensure, in this operating mode, that the heat exchanger 99 remains inoperative, the valve 110 is in a setting which liberates the flow through the by-pass conduit 109 and shuts off the flow through the heat exchanger 99. In order for the heat energy contained in the coolant to be drawn off, the valve 110' adopts a setting which causes the heat exchanger 107 to be acted upon by the coolant current. A corresponding cool-air current through the heat exchanger 107 is ensured by the fan 108.

Consideration should certainly be given to constructing the arrangement described in FIG. 5 without the second air-current control element 98 and the inflow control element 95 with the corresponding fresh-air conduit and the blower 26. In this case, the air current guided between the evaporator 101 and the heat exchanger 99 would remain constantly unaffected and the proportions of exhaust air and fresh air would be solely determined by the first air-current control element 97.

In the above-described illustrative embodiments, the air-sided control elements are represented in shut-off setting or pass-through setting. Depending upon the desired temperature of the cool-air current and of the heating or air-conditioning air, regulation by a plurality of intermediate settings of these air-control elements is of course possible. The described coolant-sided directional control valves are constructed, on the other hand, such that they only adopt the represented switching settings, but the coolant current can also, where necessary, be split between the heat exchangers 74 and 75 by a fixed-cycle operation.

We claim:

1. A device for cooling drive components and for controlling a temperature inside a passenger compartment, of a motor vehicle, comprising:
   a cooling circuit through which a coolant is circulated for cooling the drive components;
   a refrigerant circuit including a condenser and an evaporator; and
   an air-guide duct through which an air current is circulated and arranged to exchange heat with said cooling circuit and said refrigerant circuit, said air-guide duct extending from an outflow opening of the passenger compartment to an intake-air opening thereof, said air-guide duct including
   an inflow air-current control element for mixing the air current from said passenger compartment with a fresh air flow,
   a heat exchanger, disposed downstream of said inflow air-current control element, for transferring heat from said coolant of said cooling circuit to the mixed air current of the air-guide duct,
   an outflow air-current control element, disposed downstream of said heat exchanger, for dividing the mixed air current of the air-guide duct into an air component introduced into the passenger compartment and an exhaust air component drawn off into the environment, and
   a bypass duct having a first end disposed upstream of the inflow air-current control element and a second end connected to said outflow air-current control element such that a bypass flow of said bypass duct is introduced into the passenger compartment and said mixed air current is drawn off into the environment,
   wherein said evaporator is disposed upstream of the inflow air-current control element and said condenser is disposed downstream of the inflow air-current control element but upstream of the outflow air-current control element.

2. The device according to claim 1, wherein said air-guide duct further includes a blower for maintaining the air current through said air-guide duct.

3. The device according to claim 1, wherein said air-guide duct further includes a flow quantity divider disposed downstream of said evaporator but upstream of said inflow air-current control element, said flow quantity divider having an output connected to said inflow air-current control element, said bypass duct, and an exhaust duct.

4. The device according to claim 1, wherein said air-guide duct further includes a heat source disposed downstream of said outflow air-current control element.

5. The device according to claim 4, wherein said heat source is an electric booster heater.

6. A temperature control device for an electric vehicle, comprising:

an electric motor;

a cooling circuit through which coolant is circulated through drive components of the electric motor;

a refrigerant circuit including an evaporator and a condenser;

an air-guide duct through which an air current is circulated, said air-guide duct extending from an outflow opening of the passenger compartment to an intake-air opening thereof;

inflow air-current control element which controls a mixing of the air current from the passenger compartment with a fresh air flow;

a heat exchanger, disposed downstream of the inflow air-current control element, for transferring heat from said coolant of said cooling circuit to the air current of the air-guide duct; and outflow air-current control element, disposed downstream of said heat exchanger, for dividing the air current circulated through the heat exchanger into an air component introduced into the passenger compartment and an exhaust air component drawn off into the environment, wherein the air-guide duct is divided into at least three sections, a first section extending from the passenger compartment to the inflow air-current control element, a second section connecting the inflow air-current control element to the outflow air-current control element, and a third section extending from the outflow air-current control element to the passenger compartment, and includes a bypass duct having a first end disposed in the first section and a second end connected to the outflow air-current control element, wherein the outflow air-current control element transmits a bypass flow of the bypass duct as the air component introduced into the passenger compartment and transmits the air current circulated through the heat exchanger as the exhaust air component, and wherein the evaporator is disposed in the first section and the condenser is disposed in the second section.

7. The device according to claim 6, wherein the air-guide duct includes a blower for maintaining the air current through the air-guide duct.

8. The device according to claim 7, wherein the air-guide duct further includes a heat source disposed downstream of the heat exchanger.

9. The device according to claim 8, wherein the heat source is an electric booster heater.

10. The device according to claim 6, wherein the air-guide duct further includes a flow quantity divider disposed downstream of the evaporator but upstream of the inflow air-current control element, the flow quantity divider having an output connected to the inflow air-current control element, the bypass duct, and an exhaust duct.

* * * * *